April 23, 1968     L. O. UPTON     3,379,558
SEALING POROSITY OF FIBER FACE PLATES BY YTTRIUM RESINATE
Filed Oct. 2, 1964
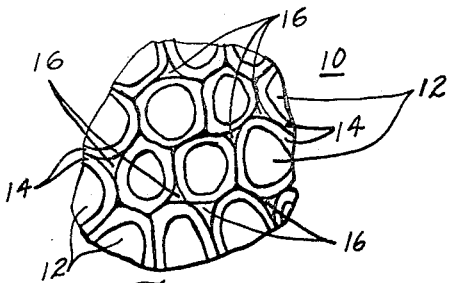
Fig. 1
PRIOR ART
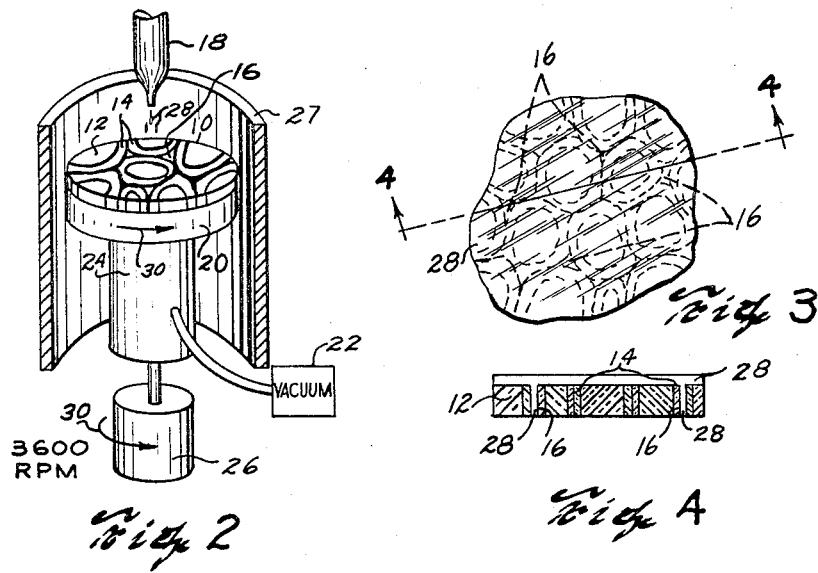
Fig. 2
Fig. 3
Fig. 4
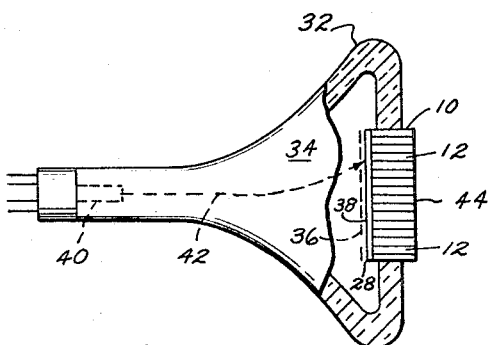
Fig. 5
INVENTOR.
LEE O. UPTON
BY
ATTORNEY United States Patent Office 3,379,558
Patented Apr. 23, 1968

3,379,558
SEALING POROSITY OF FIBER FACE PLATES BY YTTRIUM RESINATE
Lee O. Upton, Sturbridge, Mass., assignor to American Optical Company, Southbridge, Mass., a voluntary association of Massachusetts
Filed Oct. 2, 1964, Ser. No. 401,029
2 Claims. (Cl. 117—66)

ABSTRACT OF THE DISCLOSURE

An improved method of sealing porosities in plate structures formed of a multiplicity of fused fiber elements by firing the fiber plates with a coating solution of yttrium resinate.

This invention relates to plate structures having energy-receiving and emitting opposite end faces and formed of a multiplicity of fused fiber elements extending from one face to the other. The invention also relates to a novel and improved method of sealing porosities in such structures.

Fiber plates are used in energy-converting devices to conduct light or other forms of energy from one compartment to another in the device or, as in the case of cathode ray tubes, to conduct such energy through and to the exterior of an evacuated envelope. In the cathode ray tube application, the face plate or fiber plate must be capable of sustaining the vacuum provided therewithin for the expected life of the tube.

Fiber face plates are formed by bundling a number of individual fiber elements together into a mosaic configuration and heating that array to fusing temperature. During fusion, compressive force is usually applied laterally to the array of fiber elements to seal as many voids therebetween as possible. However, it is difficult to obtain a truly hermetic seal between each and every fiber at the time the face plate is fabricated. Where such a seal is not attained, the resultant structure is permeable to gases when subjected to pressure or vacuum developed within the tube into which it is sealed. Therefore, the plate is then unsuitable for use as a part of an exterior wall of evacuated devices such as cathode ray tubes or the like.

Heretofore, numerous fabricating techniques have been employed to alleviate the aforementioned problem. For instance, exceptionally high temperatures and pressures have been employed to assure a complete vacuum seal between all fiber elements of a face plate structure. However, serious distortion has resulted from the high temperatures and pressures involved, so that the optical or energy-transmitting characteristics of the plate have been degraded.

Other examples of attempts to hermetically seal a face plate can be categorized as coating solutions which have unfortunately resulted in a similar degradation of the optical or energy-transmitting characteristics of the plate. For instance, coatings such as germanium and barium oxides are strongly susceptible to reduction and browning at temperatures above 1000° F., so that when these coatings are fired, the light-conduction properties of the face plate are adversely affected.

Accordingly, an object of the present invention is to provide a method for the sealing of porous fiber plate structures in a manner that does not adversely effect the primary function of the plate, which is to conduct energy or light images without significant distortion.

A further object of the present invention is to provide with the foregoing and other methods a hermetically sealed fiber face plate, which is useful in a cathode ray tube structure or the like.

These and other objects are accomplished in one embodiment of the invention which is a method comprising the steps of fabricating a fiber face plate, depositing on the plate an yttrium resinate, thereafter allowing the coating to soak in, spinning the face plate, firing the face plate, cooling the coated plate and testing for leakage, then re-depositing and refiring the face plate by a repetition of the above steps if leaks are found.

A further embodiment of the invention comprises a product of the above or another method featuring a fiber optic face plate coated by at least one layer of approximately a $2 \times 10^{-6}$ inch thick, hardened coating of a solution of an yttrium oxide and an essential oil, which also fills any spaces between the individual fibers adjacent in the fiber bundle, between fiber core and coating, or within a fiber core. The present invention also contemplates a cathode ray tube in which a portion of the envelope will comprise an energy-conducting face plate constructed as described above.

Other features, embodiments, and objects of the present invention will be apparent from the following more detailed description with reference to the accompanying drawings, wherein:

FIG. 1 is a greatly enlarged fragmentary plan view of a face plate which is to be coated according to the present invention;

FIG. 2 is an isometric drawing, partly in section, of the apparatus used in the deposition of the coating for the fiber face plate and the spinning of the face plate for drying that coating;

FIG. 3 is a greatly enlarged fragmentary view of the face plate of FIG. 1 with the coating thereon for hermetically sealing said plate;

FIG. 4 is a side section view of the fragmentary portion of the face plate, which is taken through section 4—4 of FIG. 3, showing the fibers, the coating, and the manner in which the coating seals the face plate; and FIG. 5 illustrates an elevation view, partly in section, of a cathode ray tube having an enery-conducting face plate, which is fabricated according to the present invention.

Referring first to FIG. 1, there is shown a greatly enlarged fragmentary plan view of the face plate to which the sealing process and product of this invention are especially applicable. The fibers of the fiber plate 10 embody a core 12 of a relatively high index of refraction surrounded by a thin cladding 14 of relatively low index. The cores and cladding provide a light-reflecting interface to conduct light incident on one side of the plate 10 to the other, if the incident angle to the interface is greater than the critical angle of reflection for the interface. The core, for instance, can be formed of optical flint glass with an index of refraction of approximately 1.75 and a cladding of crown or soda-lime glass with an index of refraction of approximately 1.52. Also, the core and cladding can be of 1.81 index lanthanum flint and 1.48 index borosilicate glasses, respectively. (Other glasses are likewise useful.) The fibers can range in size from approximately two or three microns to 100 microns or larger, but are preferred in sizes of only a few microns, since the smaller diameter fibers produce better resolution in transferring light images.

The fused structure of fiber plate 10 is formed of a multiplicity of clad fibers, which are placed in side-by-side bundled relationship with each other and are heated to their fusing temperature. While heated, the bundle is compressed laterally to squeeze the fibers into intimate relationship substantially as shown in FIG. 1. The respective clad fibers may be initially circular, square, hexagonal or of any other desired cross-sectional configuration, with substantially circular fibers being shown in FIG. 1 for the purpose of illustration only.

It has been found that the fused fiber structure will be likely to contain porosities 16, which give rise to the problem solved by the present invention. The porosities occur in the form of interstices 16 extending longitudinally between certain fibers or between core and cladding of the fibers and are usually minute and many times smaller in transverse dimension than the size of the fibers. They are usually so small as to be undetectable by visual inspection, even under a microscope. Nevertheless, the plate, if used in a cathode ray tube to seal a vacuum necessary for the continued successful operation of such a tube, will in time be permeable to air or gases, through the interstices, however small, sufficiently to cause failure of the tube. These interstices might not be long enough to extend directly through the fiber plate, but instead somewhat laterally into communication with one another to constitute a porosity from one side of the fiber plate to the other.

Attempts at solving the porosity problem by applying higher compression to the bundle of fibers, have tended to cause distortion sufficient to degrade the energy and light transmission capability of the plates.

In accordance with the principles of the present invention, interstices or porosities in fused fiber plates are sealed with a coating resulting from the application of a solution of yttrium resinate. This solution, if fired on one surface of the face plate, can seal even the largest leaks which occur in production; and, if necessary, successive coatings can be used if leaks are detected after a firing of one coat.

FIG. 2 illustrates the deposition, spinning, and other apparatus useful in the performance of the method of depositing an yttrium resinate on a face plate according to this invention. The yttrium solution is a resinate of yttrium metal with or without the addition of sulpho-resinate of gold or other precious metal in organic solvents such as essential oils, aromatic alcohols, ethers and ketones, light mineral oils, volatile hydrocarbons and chlorinated hydrocarbons. The essential oil is highly volatile and colorless, with an example of such an essential oil being "28C" manufactured by the Hanovia Chemical Company of East Newark, New Jersey. Also, the ratio of yttrium resinate to essential oil is approximately three-to-one by volume. The yttrium solution is applied to the face plate 10 through dropper 18, with about one gram of the solution being used for each square inch of area of the face plate.

Chuck 20 is used to hold the face plate in position and is actuated by a vacuum generator 22 through spindle 24. The spindle is operated by a motor 26 which is designed to reach speeds upwards of 3600 r.p.m., and casing 27 prevents splashing on the operator or other equipment but is separated from the chuck periphery to prevent back-splash onto the face plate.

The method is performed by affixing the face plate of FIG. 1 to a vacuum tester to detect whether or not there are detrimental porosities in the face plate. If such porosities are found, the face plate is placed on the vacuum chuck 20 and the solution 28 is applied by dropper 18 in the amount as above specified and then allowed to soak in for a period of one to fifteen minutes with the vacuum present. Thereafter, the motor 26 is used to spin the chuck in direction 30 to evenly distribute the solution as a coating for the face plate. The spinning not only serves to distribute the coating but, after one or two minutes, the desired volatilization of the coating is accomplished. The plate 10 is then removed from the chuck and placed in a furnace at room temperature. The furnace is then brought up to a temperature of approximately 1000° F. in about two hours to complete the drying process and accomplish the firing of the coated face plate.

After firing, the coated face plate is cooled on a standard annealing schedule in order to prevent strain in all glasses in the plate which are in their respective annealing ranges during the firing operation. The face plate is then removed from the furnace and the porosities are sealed by coating 28 as shown in FIG. 3, which depicts the fired face plate. The fired and coated face plate is then tested to determine whether or not the porosities are still present, and if such porosities are detected, the method as just described is repeated and a further coating deposited on the face plate. For large leaks, it is possible that as many as four or more fired applications of the coating 28 will be required. The coating or coatings of the solution are completely transparent to the energy and light being propagated through the face plate and yet impermeable to the vacuum or pressure to be sealed by the plate. It may be seen from FIG. 4 that the porosities 16 between the fiber devices are thereby filled by the coating 28 of yttrium oxide.

FIG. 5 illustrates the use of the coated fiber plate 10 in an application for which this invention is especially useful. The plate 10 is intended to receive and transfer light energy through the evacuated envelope 32 of cathode ray tube 34, and the individual fibers are each at least of a diameter which is equal to the wavelength of light to be transferred thereby. To this end, a phosphor coating 36 is provided upon the image-receiving face 38 of the plate 10, which is coated by solution 28, so that the electron gun 40 can direct an electron beam 42 onto the phosphor for the purpose of exciting it. A light image so formed on face 38 of the fiber plate is received by the fiber cores 12 which make up plate 10 and these fibers conduct a large part of the light image for reproduction thereof on face 44, exteriorly of the tube 34.

I claim:

1. A method for coating a fiber face plate comprising the steps of (a) depositing on the face plate a coating of a solution of yttrium resinate, in an essential oil, the solution being an amount equal to approximately one gram per square inch of the area of the face plate; (b) allowing the coating to soak into all porosities of the face plate under vacuum for one to fifteen minutes; (c) spinning the face plate at approximately 3,600 r.p.m.; (d) firing the face plate in a furnace starting at room temperature and increasing to approximately 1,000° F.; (e) cooling the coating and fired face plate on a standard annealing schedule.

2. A method for coating a fiber face plate comprising the steps of:
   (a) testing the face plate for porosities;
   (b) depositing on the face plate a coating of a solution of yttrium resinate with a sulpho-resinate of a precious metal in an essential oil, the solution being in an amount equal to approximately one gram per square inch of area of the face plate;
   (c) allowing the coating to soak into all porosities of the face plate under vacuum for one to fifteen minutes;

(d) spinning the face plate at approximately 3600 r.p.m.;
(e) firing the face plate in a furnace starting at room temperature and increasing to approximately 1000° F.;
(f) cooling the coated and fired face plate on a standard annealing schedule;
(g) remounting the fired face plate on a vacuum device and testing for porosities; and,
(h) repeating steps (b) through (g) when porosities are found in the performance of step (g).

References Cited

UNITED STATES PATENTS

| 2,842,457 | 7/1958 | Morgan et al. | |
| 3,034,924 | 5/1962 | Kraus et al. | 117—33.3 X |
| 3,279,942 | 10/1966 | Granitsas et al. | 350—96 X |

ALFRED L. LEAVITT, *Primary Examiner.*

H. COHEN, *Assistant Examiner.*